(12) United States Patent
Lunadier et al.

(10) Patent No.: US 9,372,818 B2
(45) Date of Patent: Jun. 21, 2016

(54) PROACTIVE QUALITY OF SERVICE IN MULTI-MATRIX SYSTEM BUS

(71) Applicant: ATMEL CORPORATION, San Jose, CA (US)

(72) Inventors: Franck Lunadier, Trets (FR); Eric Matulik, Meyreuil (FR); Renaud Tiennot, Aix en Provence (FR)

(73) Assignee: Atmel Corporation, San Jose, CA (US)

( * ) Notice: Subject to any disclaimer, the term of this patent is extended or adjusted under 35 U.S.C. 154(b) by 267 days.

(21) Appl. No.: 13/840,681

(22) Filed: Mar. 15, 2013

(65) Prior Publication Data

US 2014/0281081 A1    Sep. 18, 2014

(51) Int. Cl.
| | | |
|---|---|---|
| *G06F 13/00* | (2006.01) | |
| *G06F 13/368* | (2006.01) | |
| *G06F 12/00* | (2006.01) | |
| *G06F 13/14* | (2006.01) | |
| *G06F 13/38* | (2006.01) | |

(52) U.S. Cl.
CPC .................................. *G06F 13/368* (2013.01)

(58) Field of Classification Search
CPC . G06F 13/364; G06F 13/4022; G06F 13/362; G06F 13/4031; G06F 13/368; H04L 2012/5679
USPC .................. 710/110, 119, 120, 123, 242, 244
See application file for complete search history.

(56) References Cited

U.S. PATENT DOCUMENTS

| | | | | |
|---|---|---|---|---|
| 5,025,370 A | * | 6/1991 | Koegel | G06F 11/073 710/241 |
| 5,680,402 A | * | 10/1997 | Olnowich | H04Q 11/0478 340/2.1 |
| 6,170,032 B1 | * | 1/2001 | Izzard | G06F 7/74 710/240 |
| 7,023,840 B2 | | 4/2006 | Golla et al. | |
| 7,062,582 B1 | * | 6/2006 | Chowdhuri | 710/116 |
| 7,080,177 B2 | * | 7/2006 | Neuman | 710/240 |
| 7,130,946 B2 | * | 10/2006 | Abhay et al. | 710/242 |
| 7,302,686 B2 | * | 11/2007 | Togawa | G06F 9/4887 709/203 |
| 7,549,004 B1 | * | 6/2009 | Sousa et al. | 710/110 |
| 7,710,989 B2 | | 5/2010 | Chew | |
| 7,774,356 B2 | * | 8/2010 | Cui | G06F 9/52 707/769 |
| 7,925,805 B2 | | 4/2011 | Shin et al. | |
| 8,199,751 B2 | | 6/2012 | Scandurra et al. | |
| 8,566,612 B2 | | 10/2013 | Davis et al. | |
| 8,612,648 B1 | | 12/2013 | Murray | |
| 2002/0094847 A1 | * | 7/2002 | Han | H04M 1/72552 455/567 |

(Continued)

*Primary Examiner* — Faisal M Zaman
(74) *Attorney, Agent, or Firm* — Fish & Richardson P.C.

(57) ABSTRACT

A multi-matrix bus system is disclosed that provides proactive quality of service (QoS) by propagating, as soon as possible through an arbitration node in a network transfer request path, a highest priority value coming from an upstream arbitration node or master that has a current bus request pending at the arbitration node. The bus system ensures that any last downstream arbitration node knows at any time which is the highest priority request pending in the network transfer request path from the masters that are competing to share the bus layer switches and arbitration nodes in the network transfer request path.

20 Claims, 8 Drawing Sheets

(56) References Cited

U.S. PATENT DOCUMENTS

| | | |
|---|---|---|
| 2002/0126541 A1 | 9/2002 | Spiegel et al. |
| 2002/0178232 A1* | 11/2002 | Ferguson ............ G06Q 30/0251 709/217 |
| 2004/0236887 A1* | 11/2004 | Kim et al. ..................... 710/110 |
| 2005/0060710 A1* | 3/2005 | Kush ....................... G06F 9/524 718/103 |
| 2006/0190649 A1* | 8/2006 | Ganasan ........................ 710/113 |
| 2006/0271715 A1* | 11/2006 | Harris et al. .................. 710/110 |
| 2007/0130344 A1* | 6/2007 | Pepper .................. G06F 3/0613 709/227 |
| 2007/0204076 A1 | 8/2007 | Arulambalam et al. |
| 2008/0244131 A1* | 10/2008 | Vergnes et al. ............... 710/110 |
| 2009/0287865 A1* | 11/2009 | Aldworth et al. ............ 710/110 |
| 2009/0323532 A1 | 12/2009 | Lai |
| 2011/0119413 A1 | 5/2011 | Gulati et al. |
| 2011/0302345 A1 | 12/2011 | Boucard et al. |
| 2011/0307895 A1* | 12/2011 | Liao ....................... G06F 9/5027 718/102 |
| 2012/0110106 A1 | 5/2012 | De Lescure et al. |
| 2012/0110535 A1* | 5/2012 | Iwahashi et al. .............. 716/122 |
| 2012/0159088 A1 | 6/2012 | Balkan et al. |
| 2012/0198266 A1* | 8/2012 | Hofmann et al. ............. 713/501 |
| 2013/0042032 A1 | 2/2013 | Mannava et al. |
| 2013/0159458 A1* | 6/2013 | Yu ........................... H04L 67/10 709/217 |
| 2014/0136644 A1* | 5/2014 | Tuononen ........... H04L 67/2852 709/213 |
| 2014/0164659 A1* | 6/2014 | Quddus ........................ 710/110 |

* cited by examiner

PROACTIVE QUALITY OF SERVICE IN MULTI-MATRIX SYSTEM BUS

TECHNICAL FIELD

This disclosure relates generally to system bus interconnects.

BACKGROUND

In some microcontrollers, bus masters are connected to bus slaves fully or partially through one or more bus matrix ports and switches. In these microcontrollers, data transfer requests from the masters to the slaves have to pass successively through several arbitration nodes. At any time, a given master may have several pending data transfer requests. Each of these transfer requests may have a dynamically changing urgency based on latency and/or bandwidth requirements.

Bus arbitration is used in these microcontrollers to meet each master's bandwidth and latency requirements and to maximize the overall available bandwidth of the system. In these microcontrollers, the arbitration nodes often arbitrate conflicts locally in the network space and only once at each arbitration node using a priority value that is statically associated with the data transfer request. Regardless of the priority of a data transfer request at any given arbitration node, the progress of the data transfer request to the target slave is dependent on the progress of the preceding transfer request at the next downstream arbitration node.

One solution to the congestion problem is to provide bus slaves with large queues that can store significant numbers of issued transfer requests. Storing the transfer requests frees up the network transfer request paths. If there is no congestion in the network transfer request path, data transfer requests can reach the arbitration end node in a short time so that high priority transfer requests are not ignored by the arbitration end node for a long time.

This queue solution has several drawbacks. Most slaves do not need large queues to arbitrate among waiting transfer requests to achieve optimization goals. For these slaves parking queues are a waste of area. For each slave, the queue should be large enough to store a number of transfer requests that is greater than or equal to the total number of transfer requests that may be issued collectively by all the masters connected to the slave. This is often not the case. If one of the slave parking queues fills up because it is not sized correctly, transactions may be backed up in the interconnect.

Due to ordering constraints on the bus or related deadlock problems, it may be impossible or complex to issue more than one transfer request at a time through a bus switch node when two or more destinations are implied. Some examples of ordering constraints are the situations observed at bus switch nodes for Advanced Microcontroller Bus Architecture (AMBA) Advanced eXtensible Interface (AXI) bus write transactions to two or more destinations and for AMBA AXI bus read transactions to two or more destinations with the same ID. A slave queue may be capable of storing more transaction requests but the network intrinsically can no longer issue more transaction requests. In these situations, an arbitration end node can still block a high priority request upstream in the network transfer request path because locally at the arbitration end node a slightly higher priority is given to another branch of the network, or because a fair use algorithm grants the ignored critical network branch later, or because by default a bandwidth optimization is running when no urgency is seen at the arbitration end node. In these situations, the arbitration scheme is inconsistent throughout the overall bus network, resulting in stability and performance problems.

Other solutions have been proposed to circumvent some of the problems described above, including restraining the number of requests or the request rate at the masters to avoid network and slave queue congestion, local bandwidth reservation at the network nodes, longer slave queues with queue room reservation for some critical masters, enlarged or duplicated bus layers. These solutions, however, often require increased logic complexity or have over constraints that may prevent bandwidth optimization.

Bus protocols with no outstanding transactions support and strongly ordered bus protocols, such as AMBA High Speed Bus (AHB) protocol, are even more problematic because they do not provide native quality of service support. Busses that implement these protocols have the advantage of small area and latency, but they also have stability and performance issues that prevent these busses from having a consistent and efficient system wide arbitration scheme.

SUMMARY

A multi-matrix bus system is disclosed that provides proactive quality of service (QoS) by propagating, as soon as possible through an arbitration node in a network transfer request path, a highest priority value coming from an upstream arbitration node or master that has a current bus request pending at the arbitration node. The bus system ensures that any last downstream arbitration node knows at any time which is the highest priority request pending in the network transfer request path from the masters that are competing to share the bus layer switches and arbitration nodes in the network transfer request path. By using a single priority coding scheme throughout the bus system, a highest priority pending request from a competing master is guaranteed to be considered by each successive arbitration node in the path down to the current blocking end arbitration node, even if the current blocking end arbitration node is not part of the network transfer request path from a master to its currently selected slave or is not part of the network transfer request path to the slave targeted with this highest priority request and yet to be selected.

Particular implementations of the multi-matrix system bus provide one or more of the following advantages: 1) a system wide consistent and highly reactive arbitration scheme without the need to use complex bus protocols and oversized parking queues; 2) any urgency increase at a master is guaranteed to be quickly and consistently promoted through each bus switch arbitration node on the blocking path as far as no higher priority transaction is incoming from another branch at the arbitration node; 3) the priority signal encoding the urgency level is forwarded where relevant and is immediately redirected to a new blocking path in case of change; and 4) arbitration of transaction requests are not local to the arbitration node, avoiding difficult tuning processes that could reduce system performance, such as empirical bandwidth scheduling at the bus switch nodes, master request rate restrictions or forcing transfer requests regardless of prioritization.

DETAILED DESCRIPTION

The disclosed implementations can included in a microcontroller integrated circuit that includes a plurality of system bus masters, some or all of which may be coupled, through one or more master ports which in turn may be coupled through one or more system bus matrix switches to a plurality of system bus slaves, some of which may be multiport bus slaves or single port bus slaves.

Example Microcontroller Architecture

Figure 1:
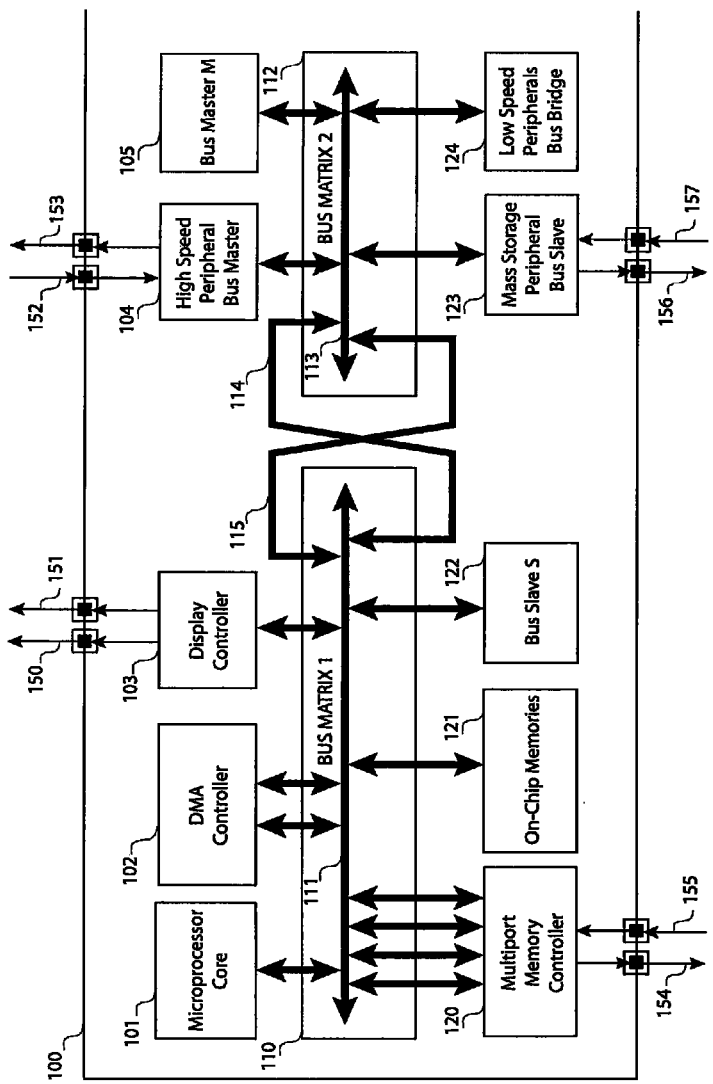
FIG. 1 is a block diagram an example microcontroller that implements a system bus matrix capable of providing proactive QoS.

FIG. 1 is a block diagram an example microcontroller 100 that implements a system bus matrix capable of providing proactive QoS. In some implementations, microcontroller 100 may include bus masters 101-105 and bus slaves 120-124. Other implementations may include more or fewer masters and slaves.

In the example shown, bust masters include microprocessor core 101, Direct Memory Access (DMA) controller 102, display controller 103, high-speed peripheral bus master 104 and bus master M 105. Bus slaves include multiport memory controller 120, on-chip memories 121, bus slaves 122, mass storage peripheral bus slave 123 and low-speed peripherals bus bridge 124. Bus slaves may be single port or multiport slaves having M slave ports that are individually connected to one of M or less slave ports of one or more system bus matrices. An example multiport slave is memory controller 120. Bus masters may be connected to one or more bus matrices, or directly to bus slaves using one or more master ports. Bus masters or bus slave peripherals may or may not be connected outside microcontroller 100 through dedicated pads 150-157.

Bus matrices 110, 112 may be used in the design of identical or distinct internal data bus widths, such as internal busses 111, 113, whether working or not at the same clock speed. Any matrix pair may provide interconnection through one or several master ports and one or several slave ports, such as matrix 110, which is shown coupled with only one of its slave ports to matrix 112 master port through interconnect bus layer 115. Matrix 112 is shown coupled with only one of its slave ports to matrix 110 master port through interconnect bus layer 114. Whether any given bus matrix slave can or cannot be accessed from a given master through a unique or through several paths is design dependent, and no connectivity restriction is assumed in FIG. 1, except for non-functional paths like closed-loop paths which generally do not make sense or could end up in a deadlock.

Figure 2:
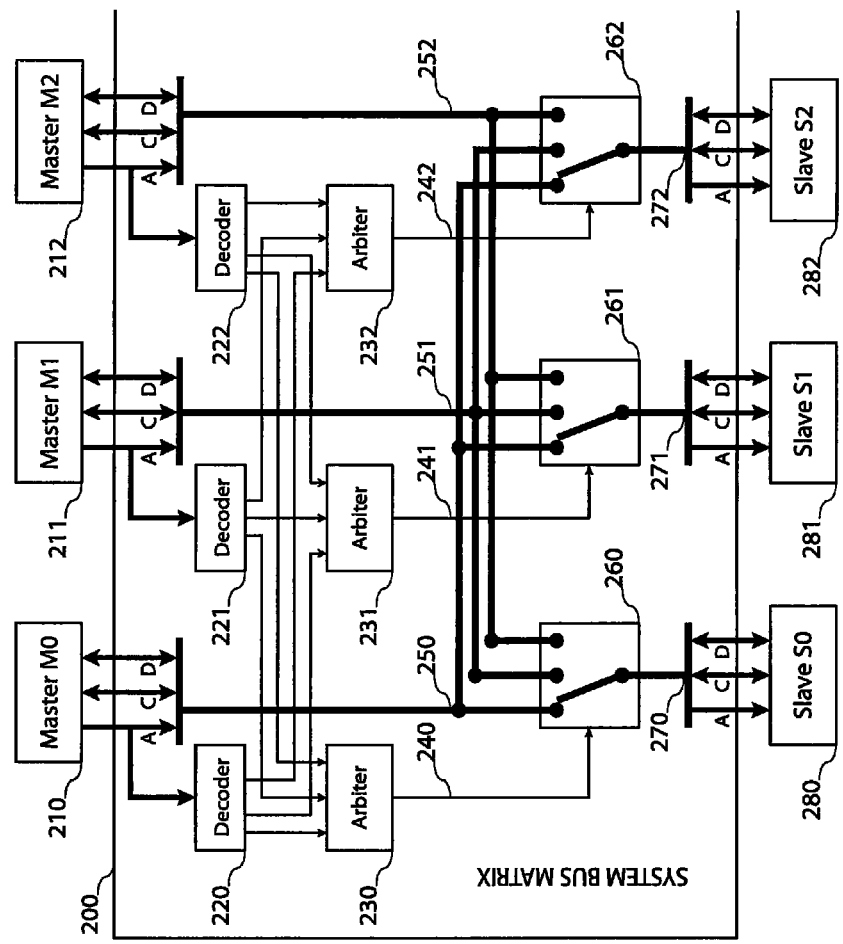
FIG. 2 is a schematic diagram of a portion of the internal and external connectivity of the system bus matrix of FIG. 1.

FIG. 2 is a schematic diagram of a portion of internal and external connectivity of system bus matrices 110, 112 of FIG. 1. Master bus layers 250, 251, 252 are hardwired to masters 210 (M0), 211 (M1), 212 (M2) and slave bus layers 270, 271, 272 are hardwired to slaves 280 (S0), 281 (S1), 282 (S2). In the example shown, three masters and three slaves are represented; however, no restriction is intended on the number of masters or slaves. The masters and slaves represented in FIG. 2 may be or may not be another system bus matrix or a peripheral. A similar matrix may also be partly or totally implemented in a peripheral master or a peripheral slave whenever a peripheral internal bus layer should be arbitrated between multiple incoming transfer requests at this peripheral.

Accessing bus slave 280, 281 or 282 from bus master 210, 211 or 212 includes performing steps for data exchange between the master and slave. The data exchanges are performed by means throughout system bus matrix 200, which dynamically route bus master layers 250, 251, 252 to bus slave layers 270, 271, 272 in a one-to-one relationship. A bus layer includes address signals A, control signals C, and bidirectional data D signals. Control signals C may indicate implicitly or explicitly transfer characteristics, such as data direction, number of bytes per each data bus cycle, type and length of bursts, type, protection and security attributes of data, requestor identity, slave availability and other bus signals. In the example shown, the control signals C of each bus layer carry a QoS or priority signal.

Prior to a data access, a corresponding transfer request is launched by any of the matrix 200 bus masters 210, 211, 212 at bus matrix 200 master ports inputs using particular combinations of address A and control C signals. Decoders 220, 221, 222 decode the access address A driven by the master to determine a unique targeted bus matrix slave bus layer 270, 271 or 272, leading to a selection or access request to arbiter 230, 231 or 232 of the targeted slave layer. The selected arbiter 230, 231 or 232 determines a single winning bus master among requesting bus masters 210, 211 or 212 and drives a switch selector signal 240, 241 or 242, which in turn couples targeted slave bus layer 270, 271 or 272 to winning bus master layer 250, 251 or 252 inside corresponding matrix switch 260, 261 or 262. Address A and control C signals of the winning master become available for a new arbitration stage inside targeted slave 280, 281 or 282 which may be made itself partly or totally of another bus matrix similar to matrix 200 or be a non-arbitrated end point for the transfer request, in which case the data exchange takes place with some delay depending on the slave and its internal state. Data exchanges may be packed in bursts of convenient lengths, for example 4, 8, 16 or more data words being transferred before a next arbitration selects a new master layer connection inside system bus matrix switch 260, 261 or 262.

Figure 3:
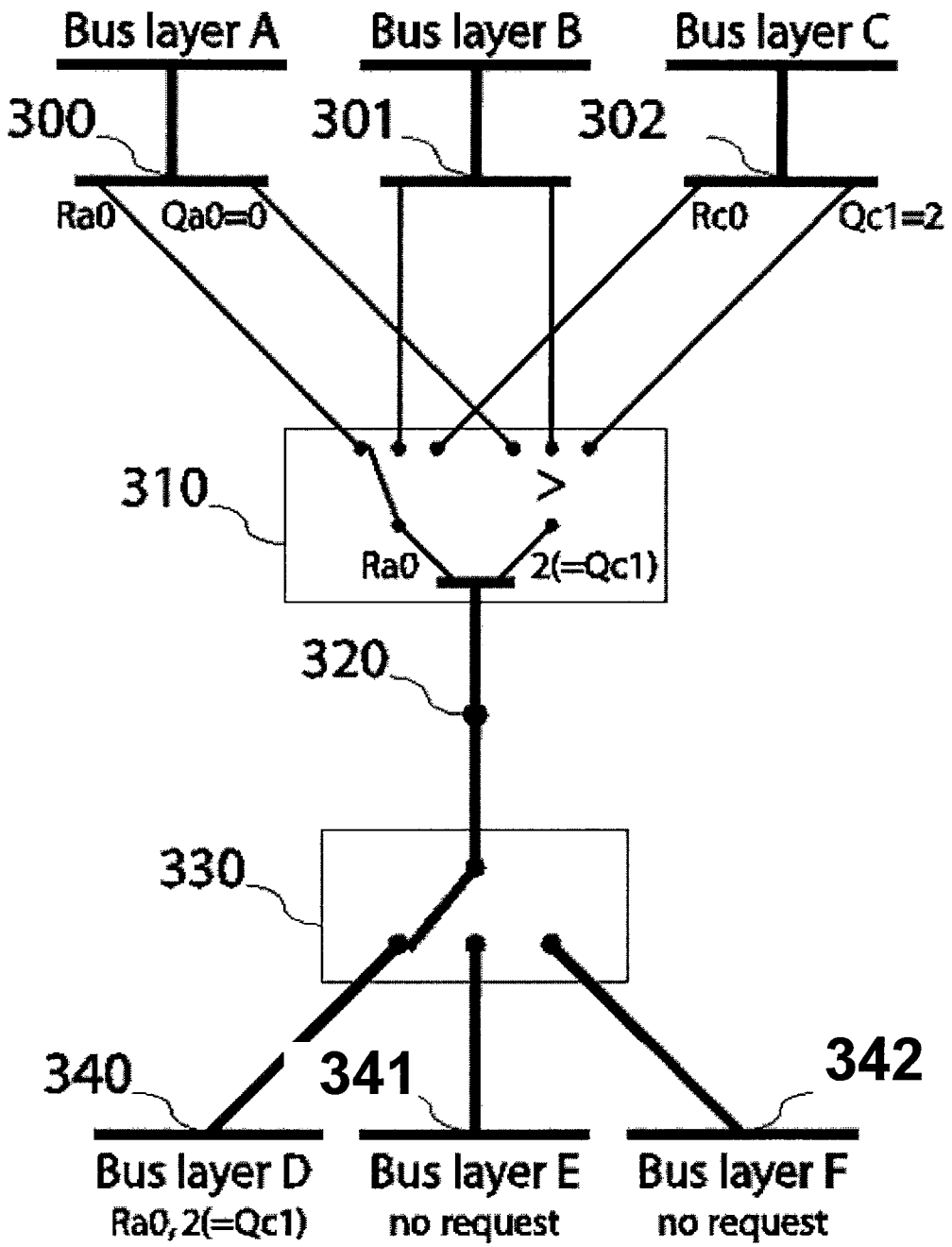
FIG. 3 is a schematic diagram of an example of a system bus node with attached upstream and downstream bus layers.

FIG. 3 is a schematic diagram of an example system bus node with attached upstream and downstream bus layers. A complete multi-layer system bus can be built by replicating the system bus node shown in FIG. 3. Any system bus node in the multi-layer system bus may be attached to any number of upstream bus layers and attached to any number of downstream bus layers. System bus nodes may be found at the connection points between interconnect matrices and inside system bus masters that arbitrate between several transfer requests at a time, qualified each by a current urgency level to be sorted and encoded on the quality of service output of that master. System bus nodes are also found in multiport slaves where multiple concurrent requests are be granted access to one peripheral or memory resource.

The example system bus node 320 shown in FIG. 3 has three upstream bus layers 300, 301, 302 and three downstream bus layers 340, 341, 342. System bus node 320 is coupled upstream to local arbitration node 310. Local arbitration node 310 controls the multiplexing of locally converging system bus layers potentially carrying each a system bus transfer request Rx from a master through none, one or several cascaded other system bus nodes and bus layers. Local arbitration node 310 receives with each transfer request Rx a quality of service value Qx. An arbitration process performed at arbitration node 310 grants access to one of the transfer requests Rx at a time by calculating a function of the transfer requests Rx and the quality of service values Qx or a fixed priority scheme. In some implementations, a fixed priority scheme may determine that if Qx>Qy, then Rx is granted else if Qx=Qy, then a fair share algorithm is used (e.g., Round-robin). Independent of the granting mechanism, the quality of service values Qx are continuously compared so that the highest priority value encoded on a quality of service signal is immediately output to system bus node 320.

At the time of the representation of FIG. 3, bus layer A has a transfer request Ra0 granted at arbitration node 310 so that bus layer A is coupled to system bus node 320 and transfer request Ra0 is forwarded downstream through system bus node 320. This coupling may last for one or several bus cycles depending on various factors, such as the burst length or the local arbitration policy. The quality of service value Qa0 encodes the urgency of transfer request Ra0.

At the time of the representation of FIG. 3, bus layer B has no transfer request pending at arbitration node 310 and bus layer C has transfer request Rc0 pending at arbitration node 310 and quality of service value Qc1=2 corresponding to a next incoming request Rc1, which indicated by the number "1" in the subscript. The quality of service value Qc1=2 is greater than the quality of service value carried by the other competing bus layers, so Qc1 is the quality of service value forwarded downstream at system bus node 320.

System bus node 320 is coupled downstream to diverging system bus switch 330, which may be controlled by a system bus decoder (not shown), which may or may not take into account some of the information carried by the transfer request Rx and/or quality of service value Qx. Diverging system bus switch 330 couples system bus node 320 to downstream system bus layer D, so that transfer request Ra0 and quality of service value Qc1=2 are carried downstream by bus layer D allowing data transfer to be performed throughout bus layers A and D.

Figure 4:
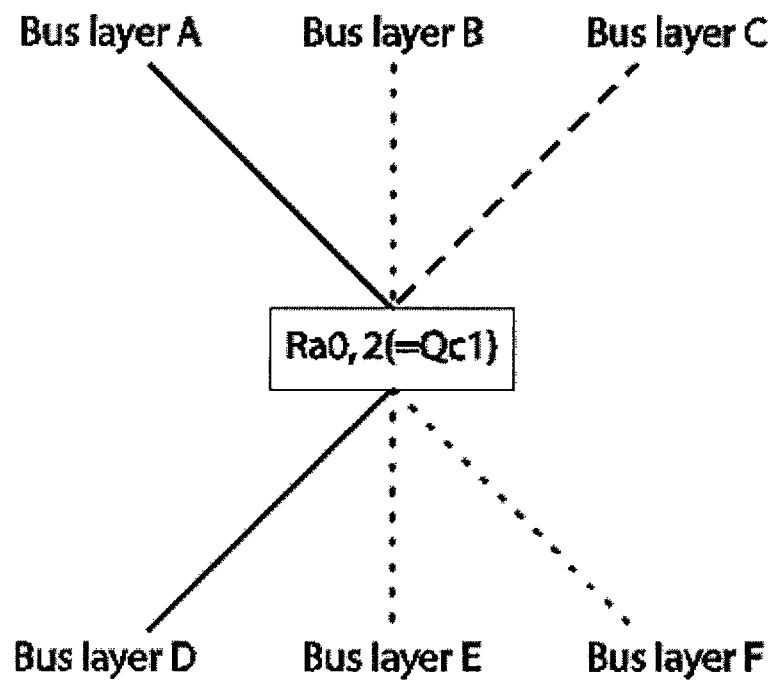
FIG. 4 is a symbolic representation of the system bus node shown in FIG. 3.

FIG. 4 is a symbolic representation of system bus node 320 shown in FIG. 3. Solid lines represent coupled layers. Dashed lines represent layers carrying a pending request. The dotted lines represent non-participating layers carrying no request. It is assumed that a quality of service scheme may be implemented using quality of service value Qx embedded in a control part of the bus layers to be arbitrated (e.g., embedded in bus control signals C shown in FIG. 2). Other encoding schemes for quality of service are also possible.

Table 1 below shows an example of a quality of service value Qx encoded in a 2-bits priority signal where the priority is represented by integers and the priority increases in ascending order of integers. For the sake of clarity, this encoding scheme will be used in the following detailed description.

TABLE 1

| Urgency/<br>Quality of Service | Symbol | Priority/<br>QoS value |
|---|---|---|
| Latency Critical | LC | 3 |
| Latency Sensitive | LS | 2 |
| Bandwidth Sensitive | BS | 1 |
| Not Sensitive | NS | 0 |

For simplicity, in this example it is assumed that the higher the priority number, the higher the access grant priority given to the bus layer carrying the priority value when participating in the arbitration process. Regardless of the quality of service encoding scheme used, it is assumed that all the arbitration nodes on the paths from bus masters to bus slaves throughout the system busses use the same encoding in a consistent way, even though the particular actions and reactivity taken by each arbitration node may vary according to local specificity or constraints. This is especially true at the first arbitration node if it is inside a master peripheral or the last arbitration node if it is inside a multiport slave peripheral.

A key point illustrated in FIG. 4 is that the quality of service depicts the current urgency at the originating master to perform a data transfer, rather than information statically associated to each transfer. The transfer request that is given priority among a current or future transfer request does not need to be known at any arbitration node downstream in the system bus, but only at the master that has launched, is launching or will launch the corresponding data transfer request. Another important point illustrated in FIG. 4 is that, as far as possible, each master in the system will launch a first transfer request in a series while driving the lowest relevant priority value for the master, and will only re-qualify the priority value to a higher priority value if and when some internal urgency level is reached for some or all the transfer requests still to be performed.

Referring again to Table 1, the urgency level categorization explained in table 1 is well understood at least implicitly by those skilled in the art, but some interpretation examples may enlighten the meaning A latency critical (LC) transfer request may be one which requires accessing the slave in a finite generally short time, for example within a time shorter than the longest turnaround time for the whole system arbitration to complete the transfers of all the latency sensitive transfers on the paths blocking the latency critical transfer. Not meeting the required access time, results in an application or system failure. For example, some systems bus masters embedding data buffers or First In First Out (FIFO) queues may fall in this category when the available data or room in their buffers/queues is not sufficient to guarantee a fail-safe functionality without their older transfer requests being re-qualified immediately as latency critical throughout the whole arbitration network.

A latency sensitive (LS) transfer may be one in which an originating master's performance gradually decreases as the transfer data access time to the slave increases. For example, the transfers initiated by microprocessor core 101 shown in FIG. 1 may permanently be classified in this category, whereas the priority of the transfers initiated by display controller 103 may transiently match this category, as their urgency is re-qualified due to the internal data filling state of display controller 103.

A bandwidth sensitive (BS) transfer may be one in which the originating master's performance gradually decreases as the average amount of data transferred through the master bus layer decreases. For example, the transfers performed by high-speed peripheral bus master 104 shown in FIG. 1 may fall permanently or transiently into this category.

A transfer not sensitive (NS) to data flow timings may be one in which timing shows insignificant external visible impact to the user. A master only performing background transfers may permanently qualify its transfer requests with this low priority. All the masters in the system may default to such a low priority level as long as their transfer urgency is low.

Finally, a main point is the use of highest priority immediate inheritance at each arbitration node output. At some bus clock cycle, the arbiter at the arbitration node may have granted one in a plurality of its incoming data transfer requests to be forwarded downward potentially to one of a plurality of next arbitration nodes. When and as long as this is the case, the priority output of this arbitration node may drive the highest incoming priority value among all the arbitration node bus layer requests inputs. Note that it is known neither at the arbiter inputs nor at its outputs if the priority driven on any bus layer concerns the current request on the same bus layer of a future request. Note that it is not known neither at the arbiter inputs nor at its outputs if the priority driven on any bus layer concerns a request which actual transfer data path is to go through this arbitration node and switch or not. Note that the priority output value might or might not increase several times during the forwarding of a single transfer request by the arbitration node whether this request is originating or not from the requesting master. The priority value inherited by the current transfer request at the arbitration node output is similarly taken into account at the selected downstream arbitration node.

Any request from a master might normally progress on its path to the targeted slave through each switch arbitration node until it reaches one such node where the request cannot be immediately granted either due to a higher priority concurrent request or to a busy bus layer. From that arbitration node a blocking path exists which has its end on some slave. This blocking slave might be different from the targeted slave by the requesting master. The blocking path might go through several arbitration nodes each forwarding a request originating from a master.

As previously described, if at some time the requesting master priority output is or raises at a higher level than that of the other masters competing for access throughout the arbitration nodes part of the blocking path and only part of it, then the blocking arbitration nodes will observe the requesting master priority and will arbitrate accordingly the blocking path until the requests on this blocking path are granted, both the blocking masters requests which will inherit of the requesting master priority and the master request. Therefore, the effect will always be to drain the current blocking paths in the order of the new incoming masters' priority, in a system wide consistent and reactive arbitration scheme.

Figure 5:
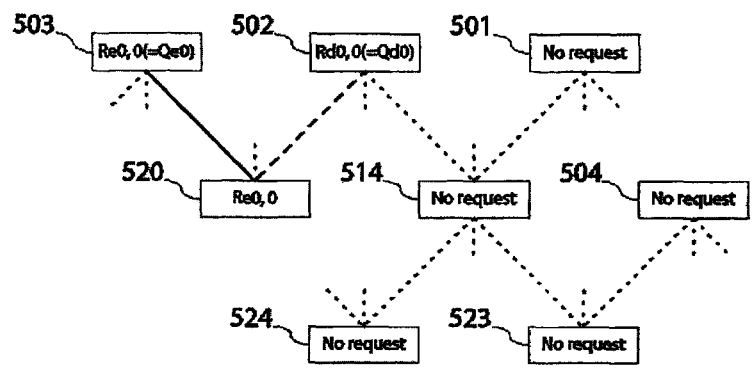
FIGS. 5-11 illustrate example scenarios of propagating high priority values to arbitration nodes.

FIGS. 5-11 illustrate example scenarios of propagating high priority values to arbitration nodes. Referring to FIGS. 1 and 5, microprocessor 101 requests access to the system bus through arbitration node 501. DMA controller 102 requests access to the system bus through arbitration node 502. Display controller 103 requests access to the system bus through arbitration node 503. High Speed Peripheral 104 requests access to the system bus through arbitration node 504. Multiport memory controller 120 access is managed within its embedded arbitration node 520. Mass storage peripheral 123 access is managed through arbitration node 523. Low-speed peripheral bridge 124 access is managed through arbitration node 524. Interconnect bus layer 114 between system bus matrices 110, 112 is managed through arbitration node 514.

From FIGS. 5-11, it is assumed that the quality of service scheme is the one shown in the example of Table 1. It is assumed that any master x, at launch of the first data transfer request Rx0 in a series Rx0 to Rxn, outputs the lower QoS value Qx0=0, except for the CPU which quality of service is fixed to the Latency Sensitive level Qc0=Qcn=2 for all its requests Rc0 to Rcn. It is assumed that the current QoS value Qxi at the master output, corresponding to its current request output value Rxi or to one of its future request output value Rxi, can be increased at any bus cycle due to an urgency increase of the data transfer request Rxi. Alternatively, the QoS value may be increased to a new Qxj value in case of a new pending request Rxj of higher urgency, whatever this new request is simultaneously or later driven at the master output. Finally, the QoS value Qxi driven at any master and arbitration node output may decrease when the corresponding data transfer completes, which is shown as Rxi and Qxi simultaneously disappearing at all of the outputs.

From FIGS. 5-11, it is assumed that, at any arbitration node, the arbitration policy gives preference to long-burst transfer completion if a low QoS value Qxi or Qxj is carried along with each data transfer request Rxi on the requesting bus layers before a new arbitration takes place. At any arbitration node, the arbitration policy is assumed to arbitrate as soon as possible if a Latency Critical Qxi=3 or Qxj=3 value is carried along with a data transfer request Rxi on any requesting bus layer.

The main purpose of FIGS. 5-11 is to show how DMA controller master 102 entering the system bus through arbitration node 502 cleans the paths to its targeted slave 124 reached through arbitration node 524, for an internal pending data transfer request Rd1 that turns out to be a critical transfer.

As illustrated in FIG. 5, DMA controller arbitration node 502 has a data transfer request Rd0 pending on multiport memory controller arbitration node 520 which QoS corresponding value Qd0=0 is also driven. Arbitration at node 520 is then performing some fair share or bandwidth optimized algorithm. The data transfer request Re0 from arbitration node 503 will potentially be granted for a long time at arbitration node 520, and at arbitration node 520 other requests from other masters may be granted before Rd0 is granted.

Figure 6:
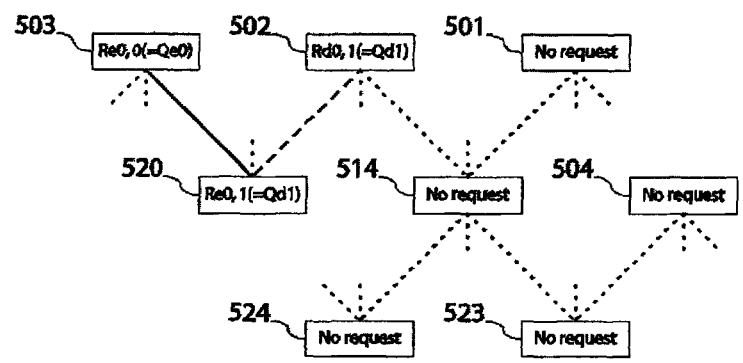

As illustrated in FIG. 6, another transfer request Rd1 starts pending inside DMA controller 102. This request targets Low-Speed Peripherals Bus Bridge 124 and shall pass through arbitration nodes 502, 514, and 524. As there is already a stalled data transfer request Rd0 on output port of DMA controller 102, DMA controller 102, in a first attempt to clear its output port, slightly increases its QoS output to Qd1=1, either because its internal buffers filling state has increased or because of the time limited nature of the data transfer request Rd1 linked to the targeted peripheral flow constraints.

Figure 7:
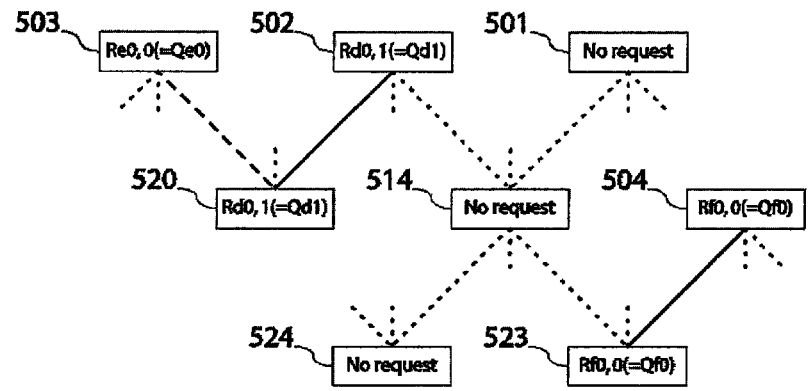

As illustrated in FIG. 7, due to forward inheritance of Qd1=1 priority, the Rd0 data transfer request is granted access to the memory at the next arbitration slot of arbitration node 520. Meanwhile, a data transfer request Rf0 has been granted from the high-speed peripheral controller to an external device through arbitration node 523. For the time being, it is of no concern for transfer request Rd1 of DMA controller 102.

Figure 8:
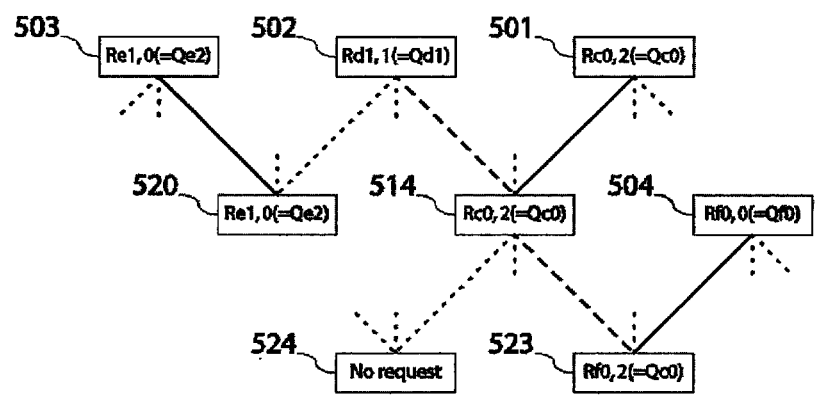

As illustrated in FIG. 8, after DMA controller 102 output is rid of Rd0, DMA controller 102 can now drive the Rd1 data transfer request, that is pass through arbitration node 502 to reach the arbitration node 514 together with its corresponding QoS value Qd1=1. But the data transfer request Rc0 of microprocessor 101 has been granted access at the arbitration node 514 either because the CPU request Rc0 came former or because the CPU request is qualified by a QoS Qc0=2 higher than Qd1=1. CPU Rc0 request is then blocking the path on Rd1 request and if nothing is done this lock situation may last at least until the next arbitration slot at arbitration node 523, and potentially longer, fully depending on the next arbitration results at the local arbitration node 523.

Figure 9:
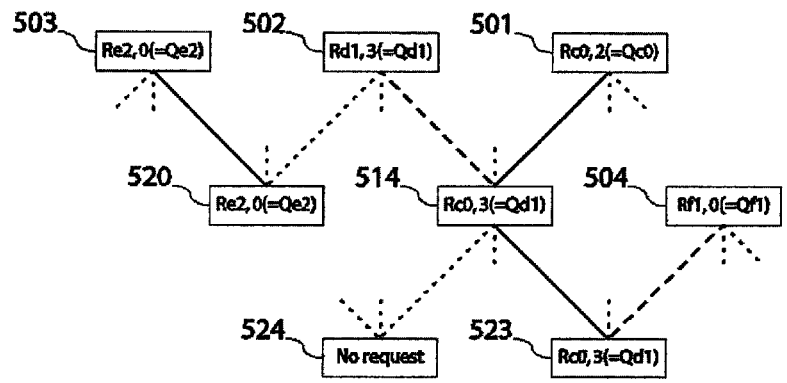

As illustrated in FIG. 9, the situation has become critical at DMA controller 102, either because of an increased number of internal buffered requests or due to the triggering of a protection timeout associated to the Rd1 request or due to the buffers filling state of the targeted peripheral close to an overrun state. This is why the Rd1 request is re-qualified to Qd1=3. This change is immediately propagated through the blocked paths to the responsible end arbitration node. Thus arbitration node 514 propagates Qd1=3 on its QoS output since it is the higher value among all its requesting input layers. Due to forward inheritance of Qd1=3 priority, the microprocessor Rc0 transfer request is immediately granted at arbitration node 523, so as to drain the system bus at arbitration node 514 of the blocking pending data transfer of microprocessor 101.

Figure 10:
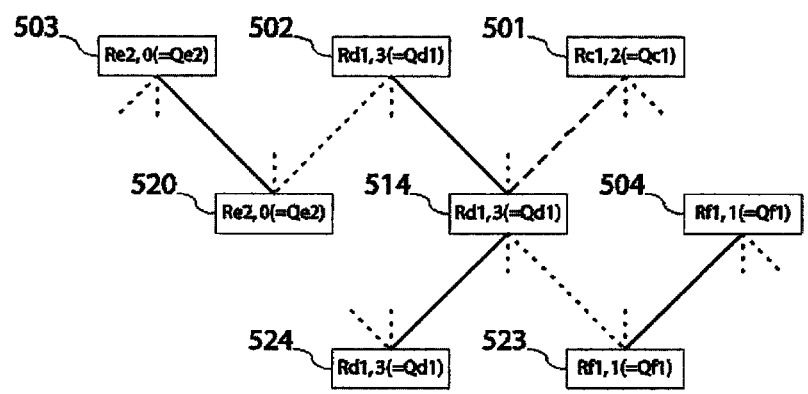

As illustrated in FIG. 10, arbitration node 514 grants immediately the Rd1, Qd1=3 data transfer request for access to its targeted slave behind arbitration node 524, while the microprocessor 101 lower priority request Rc1, Qd1=2 waits for the critical access to complete at arbitration node 514.

Figure 11:
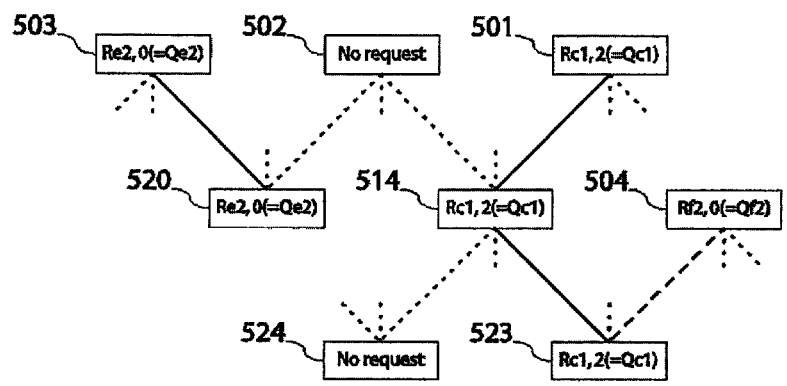

As illustrated in FIG. 11, the Rd1 data transfer request is complete and Rd1, Qd1=3 have been removed from the output of DMA controller 102 and consequently from the system bus.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. An integrated circuit device, comprising:
   a plurality of master bus devices coupled to a plurality of master bus layers;
   a plurality of slave bus devices coupled to a plurality of slave bus layers;
   a system bus matrix coupled to the plurality of master bus layers and the plurality of slave bus layers, the system bus matrix configured to dynamically route signals of the plurality of master bus layers to the plurality of slave bus layers, the system bus matrix including:
   a plurality of decoders, each decoder of the plurality of decoders coupled to one of the plurality of master bus layers, and configured for decoding address signals received from the coupled master bus layer;
   a plurality of arbiters, each arbiter of the plurality of arbiters coupled to each one of the plurality of decoders and configured to output a select signal based on results of an arbitration of transfer requests and quality of service signals generated by two or more master bus devices, wherein at least one downstream arbiter of the plurality of arbiters is configured to receive at least one of the quality of service signals from at least one upstream arbiter of the plurality of arbiters, and wherein the at least one downstream arbiter is configured to cause a transfer request generated by a first master bus device to inherit a quality of service signal for a pending transfer request generated by a second master bus device; and
   a plurality of switches, each switch of the plurality of switches coupled to one arbiter of the plurality of arbiters and each one of the plurality of master bus layers, each one of the plurality of switches configured by one of the select signals to couple one of the plurality of master bus layers to one of the plurality of slave bus layers.

2. The device of claim 1, where the transfer request and the quality of service signal entering the slave bus layer are generated by two different master bus devices.

3. The device of claim 1, where each arbiter is configured to calculate a function of the transfer requests and quality of service signals, and output the select signal based on results of the calculating.

4. The device of claim 1, where each arbiter is configured to continuously compare quality of service signals and output one of the quality of service signals that encodes a highest priority value relative to the other quality of service signals.

5. The device of claim 3, where the quality control service signal that is output is associated with a pending transfer request.

6. The device of claim 1, where the master bus layers and slave bus layers include address, data and control signals, and the control signals include the quality of service signals.

7. The device of claim 1, where the quality of service signals are generated by master bus devices and are encoded with current levels of urgency of the master bus devices to perform data transfers.

8. The device of claim 1, where the current level of urgency is categorized as a latency sensitive data transfer or a bandwidth sensitive data transfer.

9. The device of claim 1, where the integrated circuit is a microcontroller.

10. An integrated circuit device, comprising:
    a plurality of master bus layers;
    a plurality of slave bus layers; and
    a system bus matrix coupled to the plurality of master bus layers and the plurality of slave bus layers, the system bus matrix configured to route dynamically a transfer request and a quality of service signal from a master bus layer to a slave bus layer, wherein a downstream arbiter in the system bus matrix is configured to receive the quality of service signal from an upstream arbiter, and wherein the transfer request is generated by a first master bus device in the master bus layer and the quality of service signal is generated by a second master bus device in the master bus layer and the downstream node is configure to cause the transfer request to inherit the quality of service signal.

11. The device of claim 10, where the transfer request and the quality of service signal are generated by different master bus devices coupled to different master bus layers.

12. The device of claim 10, where the quality of service signal is associated with a pending transfer request of a master bus device coupled to the master bus layer.

13. The device of claim 10, where the master bus layers and slave bus layers include address, data and control signals, and the control signals include quality of service signals.

14. The device of claim 10, where the quality of service signal is encoded with a current level of urgency of a master bus device to perform a data transfer.

15. The device of claim 10, where the current level of urgency is categorized as a latency sensitive data transfer or a bandwidth sensitive data transfer.

16. The device of claim 10, where a master bus device changes the routed quality of service signal and the change is propagated to the slave bus layer independent of the routed transfer request.

17. The device of claim 10, where the integrated circuit is a microcontroller.

18. A method comprising:
    receiving, in system bus matrix of a microcontroller, two or more transfer requests and corresponding quality of service signals; and
    dynamically routing one of the transfer requests and one of the quality of service signals to a slave bus layer based on arbitration of the transfer requests and quality of service signals, where the routed transfer request and quality of service signals are generated by different master bus devices, a downstream arbiter in the system bus matrix is configured to receive the quality of service signals from an upstream arbiter, the transfer request is generated by a first master bus device in the master bus layer and the quality of service signal is generated by a second master bus device in the master bus layer and the downstream node is configure to cause the transfer request to inherit the quality of service signal.

19. The method of claim 18, where each of the quality of service signals is encoded with a current level of urgency of one of the master bus devices to perform data transfer.

20. The method of claim 19, where each of the quality of service signals is associated with a pending transfer request of one of the master bus devices.

* * * * *